US006549289B1

(12) United States Patent
Ellis (10) Patent No.: US 6,549,289 B1
(45) Date of Patent: *Apr. 15, 2003

(54) THREE-DIMENSIONAL MEASURING SYSTEM FOR ANIMALS USING LIGHT PATTERN TRIANGULATION

(75) Inventor: James S. Ellis, Broomfield, CO (US)

(73) Assignee: Pheno Imaging, Inc., Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/075,903

(22) Filed: Feb. 13, 2002

Related U.S. Application Data (63) Continuation-in-part of application No. 09/520,024, filed on Mar. 7, 2000, now Pat. No. 6,377,353.

(51) Int. Cl.[7] .............................................. G01B 11/24

(52) U.S. Cl. ..................... 356/603; 356/616; 356/396; 382/110; 348/135

(58) Field of Search ................................ 356/603, 601, 356/608, 614, 616, 622, 627, 396, 397; 348/135, 552; 250/559.2, 559.21, 559.22

(56) References Cited

U.S. PATENT DOCUMENTS

| 4,745,472 A | * | 5/1988 | Hayes |
| 4,787,739 A | * | 11/1988 | Gregory |
| 5,412,420 A | * | 5/1995 | Ellis ............................ 348/135 |
| 5,483,441 A | * | 1/1996 | Scofield ....................... 364/400 |
| 6,377,353 B1 | * | 4/2002 | Ellis ............................ 356/603 |

OTHER PUBLICATIONS

"Linear Classification Program" brochure, published by Holstein Association, Brattleboro, Vermont in Sep. 1990.*
Advertisement for a Perceptron Lasar camera, published by Perceptron, Inc., Farmington Hills, Michigan.*

* cited by examiner

Primary Examiner—Hoa Q. Pham
(74) Attorney, Agent, or Firm—James R. Young

(57) ABSTRACT

A system for determining a three-dimensional image of an animal, or other symmetric object, by projecting a pattern of light on the object and capturing two images of the reflected light with two cameras located a fixed distance apart. Using triangulation, the x, y, and z locations of each element of the light pattern is measured, thus creating a three-dimensional image of the surface of the object. Because animals are symmetric, an image need only be taken of one side of the animal, and the image mirrored, to determine the complete three dimensional characteristics of the animal.

23 Claims, 10 Drawing Sheets

THREE-DIMENSIONAL MEASURING SYSTEM FOR ANIMALS USING LIGHT PATTERN TRIANGULATION

This application is a CIP of Ser. No. 09/520,024, filed Mar. 7, 2000, now U.S. Pat. No. 6,377,353.

FIELD OF THE INVENTION

This invention relates to a system for evaluating the physical characteristics of animals and more particularly to a patterned light system for three-dimensional measuring. Even more particularly, the invention relates to projecting a pattern of light toward an animal or carcass, measuring the reflection of the light from the animal or carcass, and using the measured light to develop a three-dimensional surface scan that can be used to measure the linear, volume and angular related characteristics of the animal and provide rapid, consecutive images of an animal in motion.

BACKGROUND OF THE INVENTION

When the very first animals were domesticated mankind began to attempt to measure those animals, whether the need was to be wider, taller, longer, thicker, leaner, or stronger taking accurate measurements in a rapid manner has always been important. In modern times it has become important to measure individual growth patterns and physical traits of animals as they mature so they can be rated for maximum performance, meat production, or milk production. Additionally, it has become more and more important to measure offspring of sires and compare those groups of offspring with like kind. Obviously, the sires that provide improved offspring are in great demand and can provide the most improvement to a breed. Much of the future animal growth and genetic progress will be attributed to our ability to improve the speed and accuracy of measuring. This will afford efficiencies for our global agricultural livestock industry to provide improved quality and increase quantities of meat and milk products at moderate prices for the consumers.

Systems have evolved from measuring horses by using the approximate width of a hand; for example, a horse could be reported as 14 hands high which was about 56 inches. Currently some animals are measured at 15 different conformation points, however, most often the measurements are only visual appraisals which can prove to be subjective with errors that range from two to four inches. Thus, there is tremendous need for more information and the improved accuracy of that information to improve the measurement of growth patterns and to accelerate breed progress.

One method of compiling data is shown in U.S. Pat. No. 4,745,472 issued May 17, 1988 to Hayes, entitled "Animal Measuring System". This method uses a video camera to take a picture of the animal, and then the picture is processed by a computer system to determine the measurements. Plastic patches were placed on several points of the animal, and measurements were made of these points. Another method of compiling data is shown in U.S. Pat. No. 5,483,441 issued Jan. 9, 1996 to Scofield, Entitled "System for Evaluation Through Image Acquisition" and U.S. Pat. No. 5,576,949 issued Nov. 19, 1996 to Scofield and Engelstad, also entitled "System for Evaluation Through Image Acquisition". The above systems use a video camera, so they can only measure in two dimensions and make no reference to three-dimensional measuring.

An additional method for compiling animal conformation is shown in U.S. Pat. No. 5,673,647 issued Oct. 7, 1997 to Pratt, entitled "Cattle Management Method and System." This method, in part, explains the measuring of external animal dimensions. This method also measures using only two dimensions with no reference to three-dimensional measuring.

A Three-dimensional measuring system is shown in U.S. Pat. No. 5,412,420 issued May 2, 1995 to Ellis, entitled "Three-Dimensional Phenotypic Measuring System for Animals." This system uses laser light signals to provide a three-dimensional measuring of linear, angular and volumetric conformation traits of an animal, comparing those traits to predetermined traits and providing a rating of the animal.

It is thus apparent that there is a need in the art for an improved system which measures physical characteristics of an animal. There is further need in the art for such a system to measure in three dimensions. Another need is for such a system that does not require that patches be affixed to the animal before measuring. A still further need is for such a system that can measure with improved accuracy in three dimensions to provide linear, volume and angular measurements as well as improving the speed of imaging the animal. There is a further need for such a system that can provide rapid and consecutive three-dimensional images of an animal in motion. The present invention meets these and other needs in the art.

SUMMARY OF THE INVENTION

It is an aspect of the present invention to measure physical characteristics of a live animal or carcass, or other three dimensional object.

It is another aspect of the invention to measure the physical characteristics using a reflected pattern of light.

Still another aspect is to measure three-dimensional physical characteristics from a stereo light pattern and image collection unit.

Still another aspect is to locate specific features of an animal.

Yet another aspect is to take rapid consecutive three-dimensional images of a moving animal.

Accurate three-dimensional information can be collected from a single location using a reflected pattern of light. A three-dimensional image is created by projecting a pattern of light, for example each element of the pattern might be a horizontal band of light which can be combined with a vertical band of light wherein the bands are arranged in a grid pattern. Another example of a pattern of light is a plurality of projected light circles arranged in a grid pattern. The light pattern is projected onto the animal and reflected light is measured using at least two different cameras at a fixed distance apart, and by using triangulation, the x, y, and z locations of each elements of the light pattern is measured.

The patterned light is used to measure a predetermined number of locations on the animal and the distance to each of the these locations, thus creating a three-dimensional image of the surface of the animal. Because animals are symmetric, an image need only be taken of one side of the animal, and the image mirrored, to determine the complete characteristics of the animal. Thus a light pattern and image collection unit at a single location provides all the three-dimensional information necessary for conformation of an animal. With some breeds, such as dairy cows, it may be necessary to use a second light pattern and image collection unit or take a second image of hidden areas. For example, a dairy cow may need a second image of the mammary system for teat location as viewed from the rear, side or below to provide additional accuracy for that portion of the animal.

A computer system selects points on the animal desired for the conformation, measures the distance between these points to provide the conformation data, combines the selected conformation data for each animal with the animal's identification, and stores the conformation data and each animal's identification. In addition, an image of the animal, showing the markings of the animal, may be stored along with the other conformation data.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely to describe the general principles of the invention. The scope of the invention should be determined by referencing the appended claims.

A three-dimensional image of an animal or carcass is created by projecting a source of light through a patterned light element slide onto the animal. Alternatively, light spots could be projected by directing a low power laser beam toward the animal. The reflected pattern of light from the animal is collected by two imaging devices, typically electronic cameras. Using triangulation, each element of the reflected light pattern is measured to determine its x, y, and z coordinate.

The source of light passes through a patterned light element slide, for example, by placing a slide in a standard slide projector. The light is formed into a pattern by the slide and then projected through a lens or lenses to provide a patterned light element display on the animal or carcass being measured. The pattern may be a grid of light elements, for example circles, or squares, or the pattern may have continuous elements, for example stripes of light.

For example, a single circular beam of light can be created by placing a hole in a planar surface, such as a thick paper or metal card, next to a light source. A lens in front of the planar surface is used to focus the circular spot created by the hole within a depth of field in which the animal is located. The depth of field can be adjusted by various lens so that the animal is within the depth of field in which the spot is in focus. The reflected spot on the animal is then photographed by two cameras, each at a known location. The distance (z-axis) to the reflected spot can then be calculated using triangulation. The two known camera locations form the base of a triangle and the angles of the sides of the triangle are determined from the position of the circular spot within the image captured by the cameras. By knowing the length of the base of the triangle (i.e. the distance between the two cameras), and the two angles of the sides of the triangle, the complete triangle can be constructed, thus the location of the spot, which is at the apex of the triangle, is determined.

The animal is moved into the image scene and pattern light elements are then projected onto the animal. Alternatively, the pattern can be continuously projected as the animal is moved in front of the light projector. After the two cameras each take a picture, the digitized pictures are fed directly into a computer system, which then computes the x, y, and z locations of each element of the light pattern to form a three-dimensional surface model of the animal.

The head and tail can be included in the model, however they are usually not included in the surface model because they are not normally measured. The head on some occasions may be obstructed from view by a stanchion or head lock apparatus in a chute.

The resolution of the patterned light grid image can be varied by the size and number of bands or spots projected from the light source. For example, a tall and narrow patterned light grid display can be used to measure a hanging animal carcass or other vertical object. Changing of the field of view or the size of the elements of the display can be achieved to accommodate the measuring of larger or smaller animals. It is possible to eliminate portions of a grid pattern if there is an area of the animal that need not be measured. For example, if only the front stature, depth of body, and mammary teat location of a dairy cow are needed to be measured then portions of the grid pattern relating to other areas of the cow could be eliminated from the projected pattern light or the triangulation calculations.

Electronic imaging cameras or video cameras can be used to capture the patterned light display from the animal. By capturing a succession of sets of images, movement characteristics of the animal can also be measured. While a continuous source of patterned light is typically used, a flash or consecutive flashes of patterned light projected toward the animal and coordinated with the cameras can also be used to create a three-dimensional moving image or motion picture of the animal. By creating a series of pictures, the computer system can also select the best of the series of pictures for use. For example, the computer system might select at picture wherein a hind leg of the animal was in a particular position, such as a position that allows the mammary system of a cow to be visible.

Figure 1:
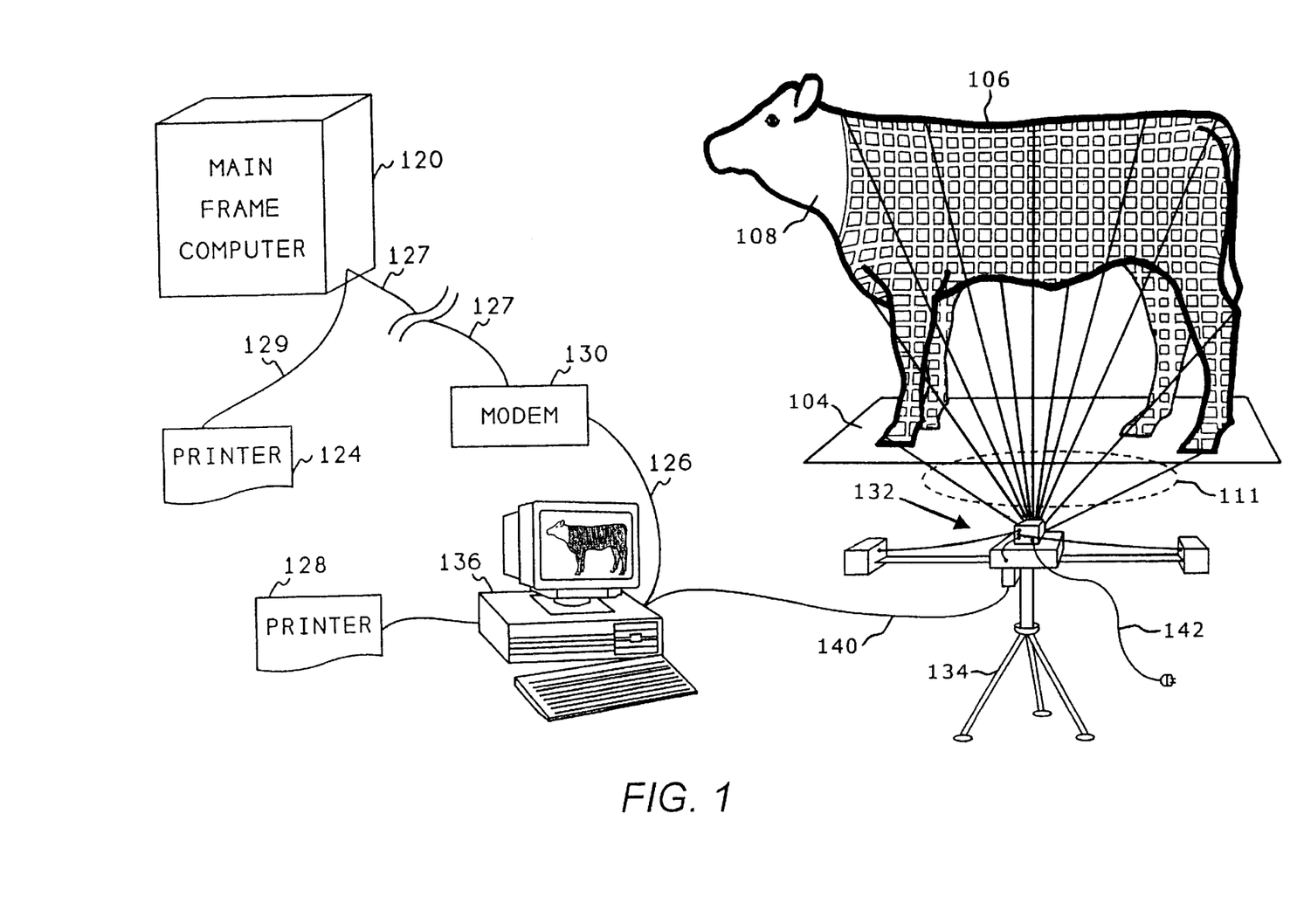
FIG. 1 shows a view of the present invention measuring and compiling data of an animal.

FIG. 1 shows the system of the present invention that measures three-dimensional phenotypic characteristics of an animal using a stereo light pattern and image collection unit. Referring now to FIG. 1, the animal 108 shown in FIG. 1 is a beef animal, standing in front of the stereo light pattern and image collection unit 132. The beef animal 108 can be moving, free standing, tied, in a stanchion or in a chute. The unit 132 and the computer 136 generate a detailed map of the entire animal within the scanned space assigning range values to each surface band or point that receives a patterned light display element. The tripod 134 can be used for the unit 132 or the unit can be hand held or set on a table or other stable means. Typically, there are approximately 900 surface points, called pattern elements, in the field of view of the unit 132, however the number of pattern elements can be increased or decreased depending upon the patterned light means used as the source. FIG. 1 does not contain sufficient detail to illustrate all surface points so the lines 111 represent only a portion of the number of patterned light signals that would cover the entire animal from the top of the animal's back 106 to the floor (or ground) 104.

An electrical source (not shown) provides electric power through an electric cable 142 for the stereo light pattern and image collection unit 132, personal computer 136 and the printer 128. In a remote environment, this electrical source can be provided by a portable generator or batteries. Connecting data cable 140 transmits the information from the stereo unit cameras to the personal computer 136. A telephone modem 130 and wires 126 and 127 can be used to transmit data from the personal computer 136 to a main frame computer 120 and on wire 129 to printer 124. A local printer 128 could also be used to print the data. When the horizontal, vertical and distance dimensions of points on the animal are provided by the system, then the three dimensional phenotypic measurements of an animal can easily be computed. See, for example, U.S. Pat. No. 5,412,420 issued May 2, 1995 to Ellis, entitled "Three-Dimensional Phenotypic Measuring System for Animals", incorporated herein by reference for all that is disclosed and taught therein. By measuring hundreds of points on the animal, the system calculates hundreds of different measurements, including angular measurements such as the angle of the rump measured between the hook bone and the pin bone. The system also calculates the volume of the barrel, loin muscle, round muscle (rear hind quarter), and numerous other muscle shapes of the animal or carcass. One particular advantage of the stereo patterned light measurements is that the system can calculate the distance to the animal, thus avoiding inaccuracies of some prior art camera systems when the animal is placed at an incorrect distance from the camera.

Figure 2:
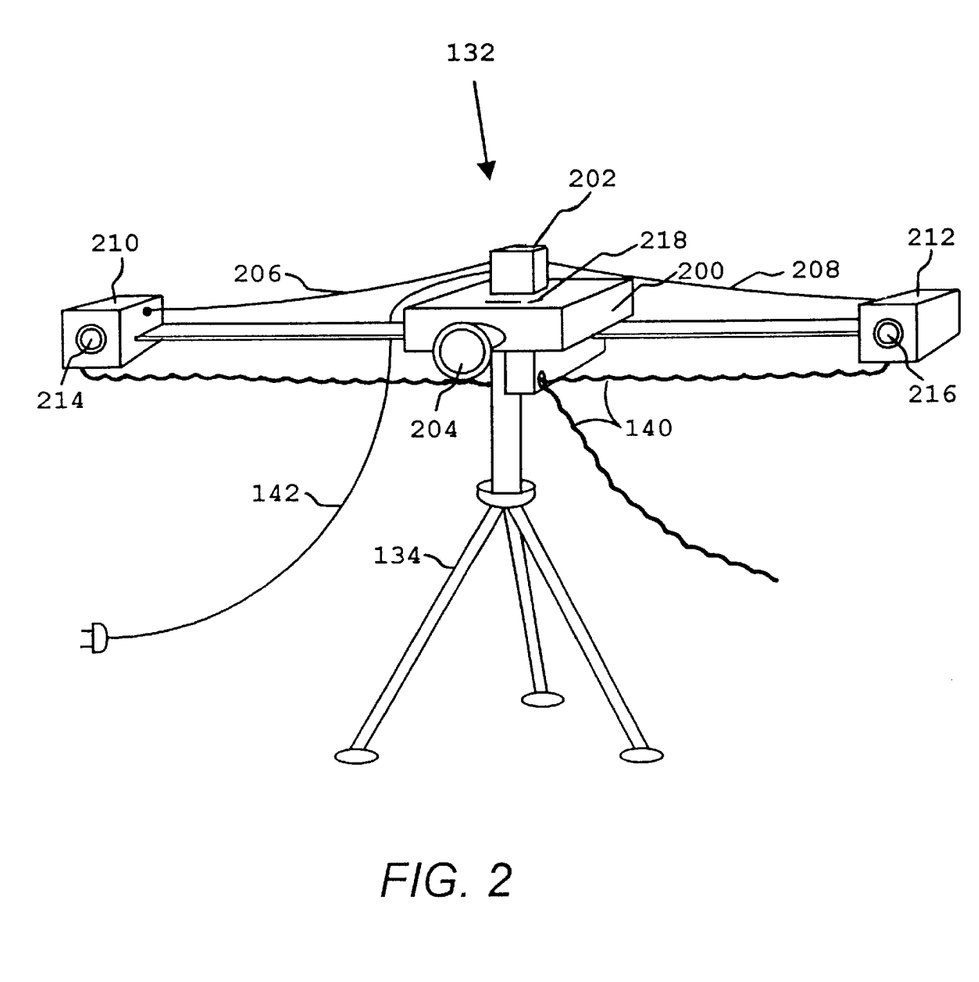
FIG. 2 shows a block diagram of a light pattern and image collection unit.

FIG. 2 shows a block diagram of the front view of the stereo light pattern and image collection unit 132, as used in the present invention. Referring to FIG. 2 a stereo light pattern and image collection unit 132 is shown on a tripod 134 having a projection system 200 and two light imaging devices 210 and 212. The light imaging devices 210 and 212 are typically conventional electronic cameras, but could be any other type of camera or video, having a lens opposite an aperture 214 and 216. The apertures 214 and 216 merely serve to limit the amount of light entering each camera and determine the depth of field of the each camera and may not be necessary with some cameras. The received patterned light elements are transferred from the stereo light pattern and image collection unit 132 to the computer system 136 by connecting data cable 140. Additional light receiving cameras can be used from various angles to the projection system 200 to add additional accuracy for the system and to enhance the imaging of portions of the animal such as the rear hind quarter that may be partially hidden from one of the cameras.

The projection system 200 is similar to a conventional slide projector, but could be any other type of laser or conventional light projection system, able to project patterned light elements. A light source (not shown) connected to a suitable electric source via electric cable 142 provides illumination. Pattern grid slides that are interchangeable using the slot 218 in the projection system 200 are used to create the pattern of combined horizontal/vertical stripes, spots or rows of spots, etc. The patterned light is then focused by lens 204 to create a focus light pattern at the approximate distance in which the animal will be presented. The animal need only be within the depth of field of the focused pattern elements. An electrical base system 202 receives the electric power from the power source through the electric cable 142 and provides electric power to the projection system 200 and the light imaging devices 210 and 212 through electric cables 206 and 208 respectively. The electric base system 202 also includes switching devises that control the harmonious projection of the patterned light displays in concert with the light imaging devices 210 and 212.

Typically the left light imaging device 210 is used to collect an image of the animal that shows the markings on the animal. Alternatively, the right light imaging device 212 can be used to collect the markings image. To collect the image of the markings, the projection system 200 is turned off, and a flash unit (416 in FIG. 4 below) is activated to capture an image of the markings. Alternatively, the projection system 200 turned off, and ambient light is used to capture an image of the markings.

Figure 3:
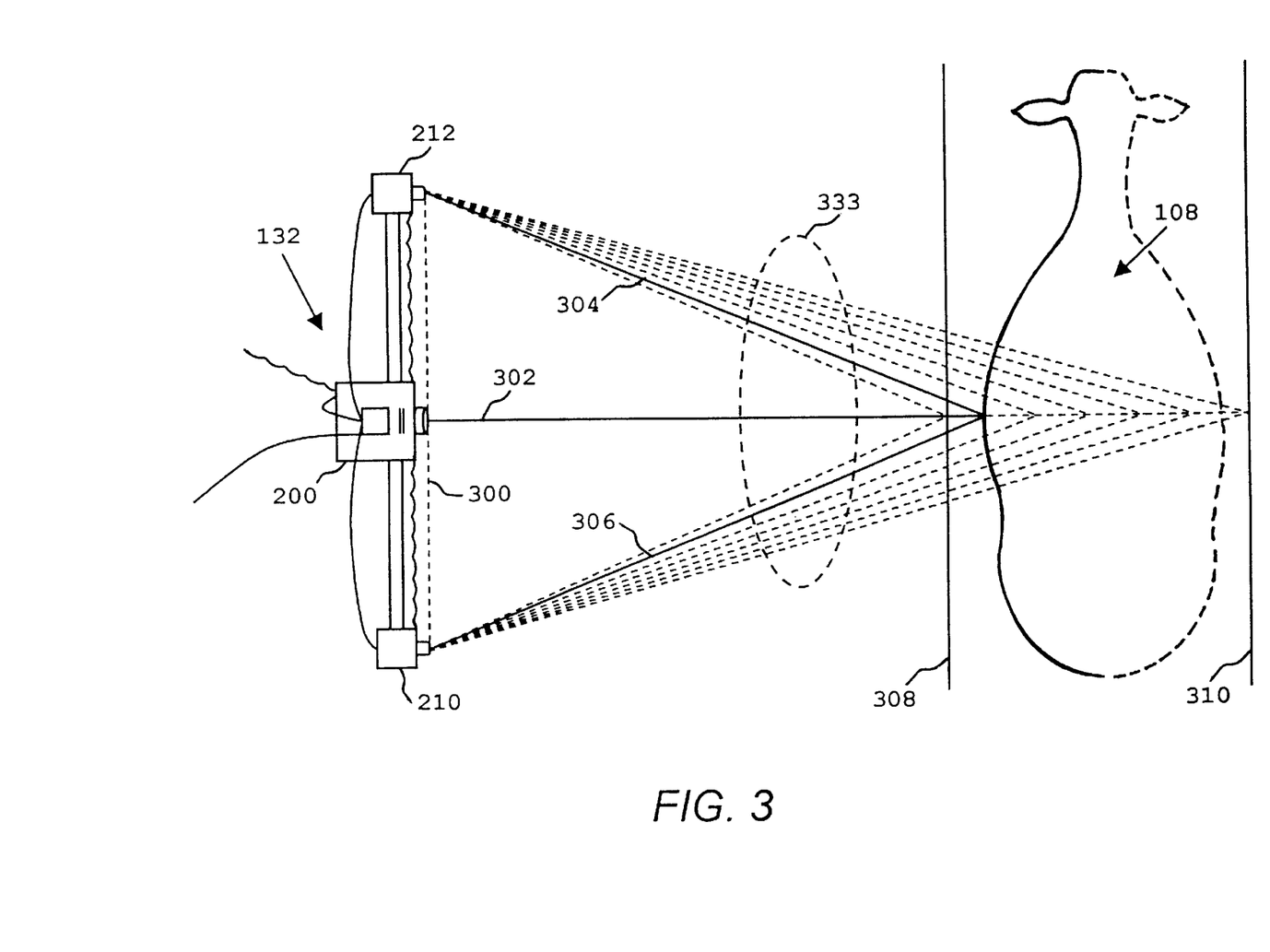
FIG. 3 shows a view of a light pattern and image collection unit projecting one element of a light pattern, and illustrating a plurality of triangles that would be formed at differing distances of the animal from the light pattern and image collection unit.
Figure 7:
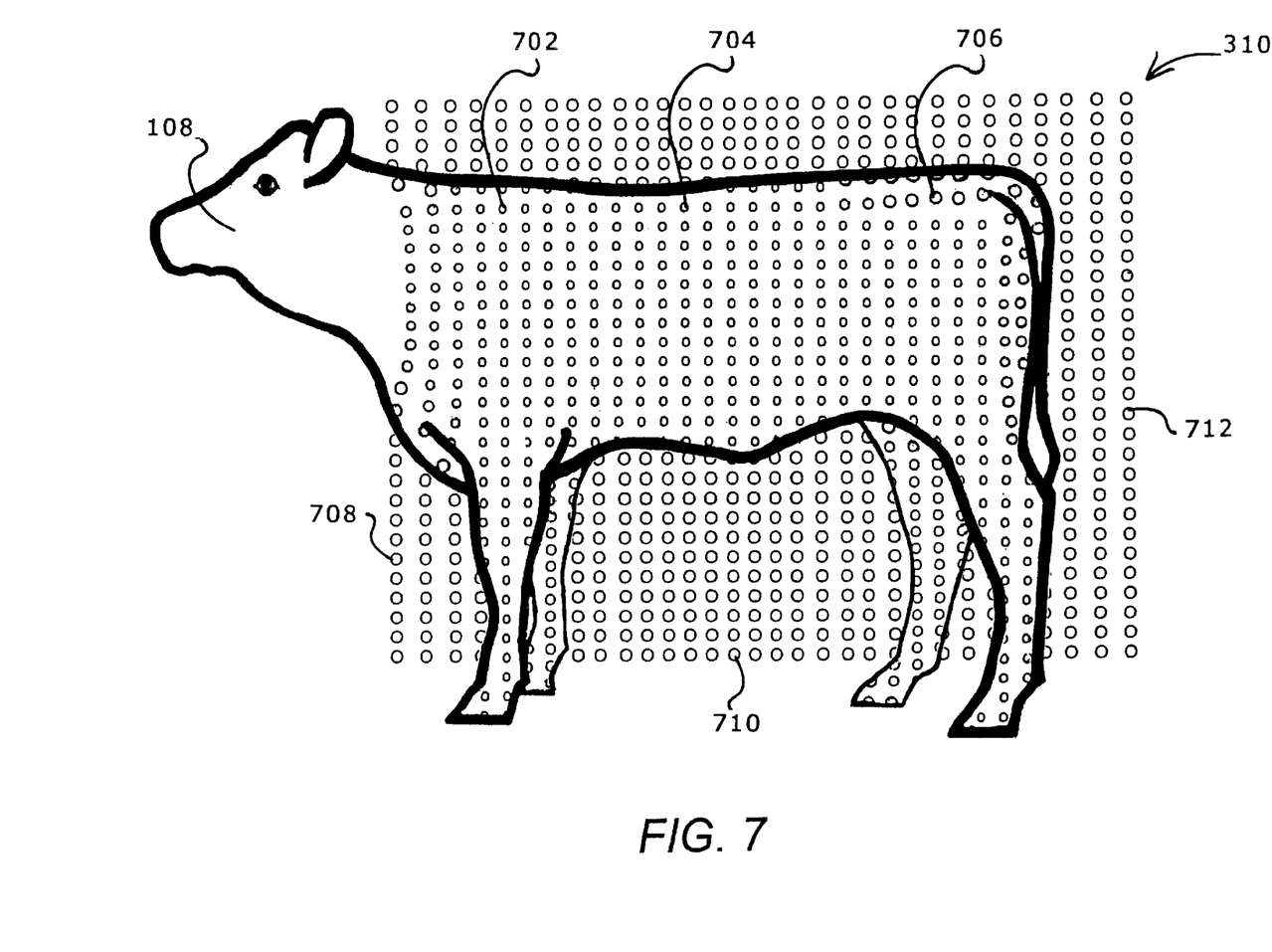
FIG. 7 shows an animal with a light pattern of a grid of light circles projected upon an animal.
Figure 8A:
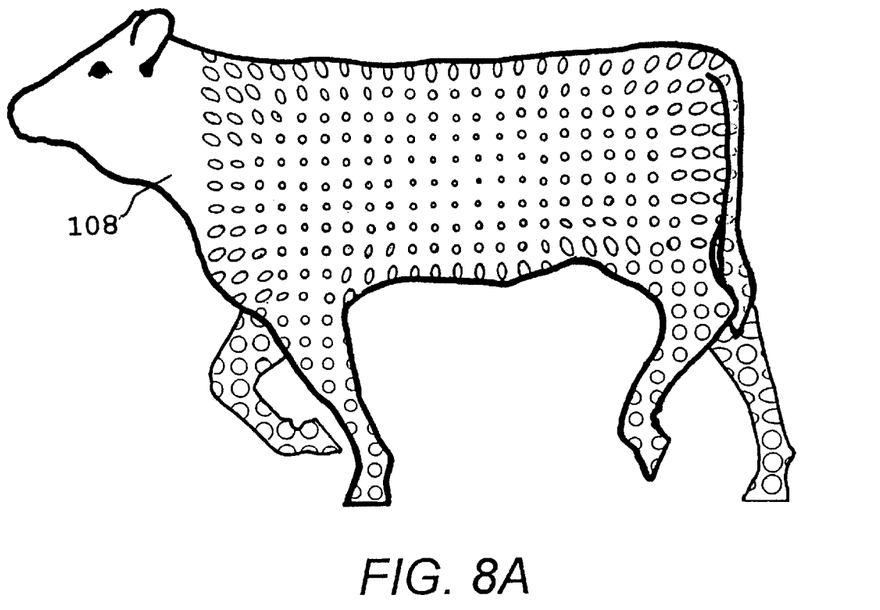
FIGS. 8A–8D show a series of consecutive scenes of circular light spot pattern elements being projected onto an animal.
Figure 8B:
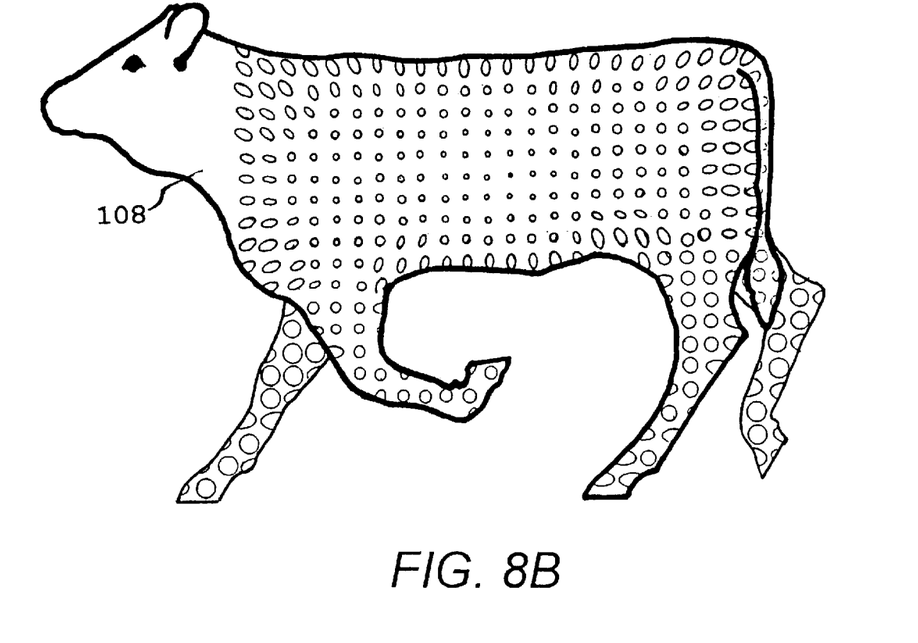
Figure 8C:
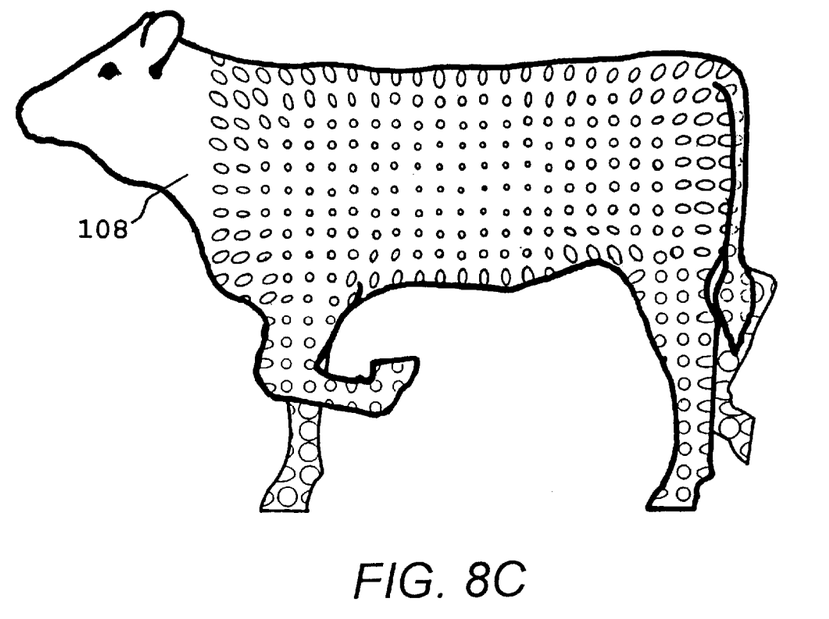
Figure 8D:
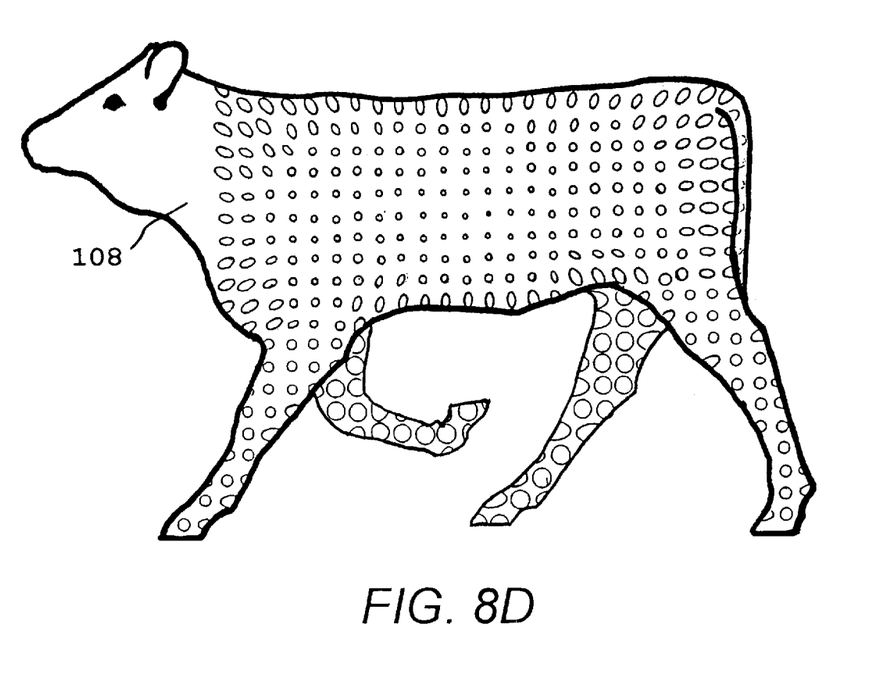

FIG. 3 is a diagram illustrating how the z-axis distance is measured and calculated using triangulation to allow for precalibration of each pattern light element. Referring to FIG. 3, a stereo light pattern and image collection unit 132 viewed from above includes a projection system 200 that projects a single pattern light element 302. In this example, the pattern light element 302 would be one of the intersections of the horizontal/vertical bands as illustrated in FIG. 1 by light rays 111 or one of the circular spot pattern light elements as illustrated in FIG. 7 in part as 702, 704, or 706.

In the absence of the animal, a single vertical planar surface (not shown) is set at the farther segment of the depth of field 310 with a pattern light element 302 projected thereon. The distance between the light receiving systems 210 and 212 is considered the base 300 of a triangle and this distance remains constant for all calibration calculations. The reflected lights elements 333 received by the light receiving systems 210 and 212 from the planar surface represented by the outer most dashed lines 333 create a triangle. The angles between the base 300 and the received light elements 333 at both light receiving systems 210 and 212 are determined and the triangle base angle co-ordinates are recorded within the computer system as precalibrated z-axis distances.

The planar surface is then moved closer to the stereo light pattern and image collection unit 132 at predetermined increments. These increments can vary from a portion of an inch to several inches depending on the desired accuracy. The above process is then repeated and another z-axis distance is precalibrated. All segments of the predetermined increments are precalibrated along the z-axis of the pattern light element 302 until the planar surface reaches the closer segment of the depth of field 308. Although all of the possible triangles in these z-axis distance calculations are difficult to include in the diagram, the numerous dashed lines 333 represent a portion of the triangles created in this precalibration process. The triangle created by the base 300 and the reflected pattern light elements 304 and 306 is an example of the z-axis distance for that particular pattern light element 302 as though the animal were present.

The precalibration process is then completed for all x, y and z-axes in the total pattern light display. Thereafter the animal 108 is presented into the depth of field. Once the pattern light display is projected onto the animal, and the pattern light elements are received from the animal and transferred to the computer then the precalibration computer system assigns z-axis distance to each x, y, and z pixel location. The combination of all of the precalibrated triangulation formulations then provide a complete three-dimensional surface model of the animal.

Continuous distance data can be acquired in both vertical and horizontal directions by using all segments of the bands that are horizontal/vertical. This is done by projecting the pattern light display onto the animal, capturing an image and then making continuous segmented triangulation formulation calculation along predetermined segmented portions of each horizontal and each vertical band of light.

Figure 4:
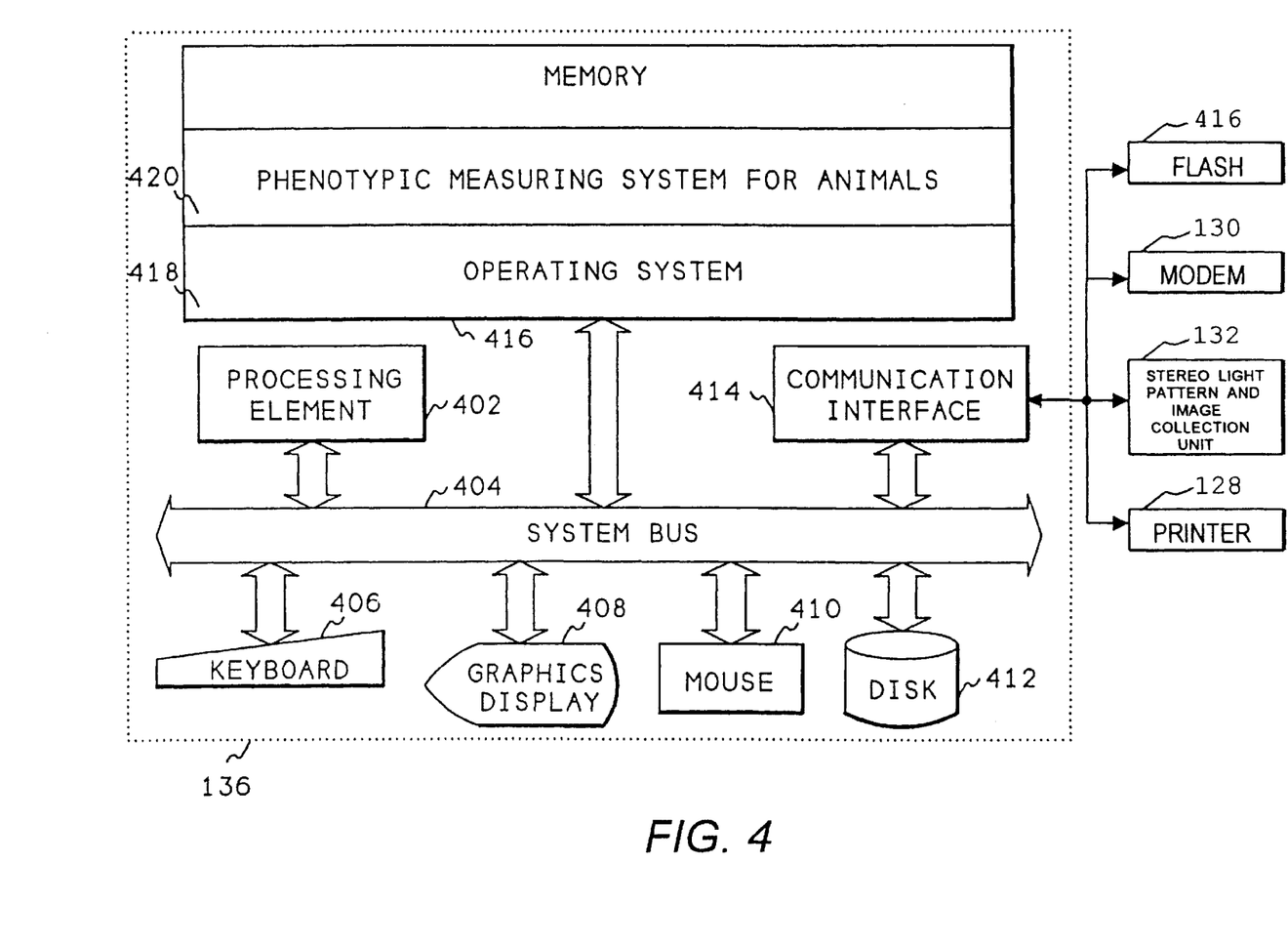
FIG. 4 shows a block diagram of the present invention.

FIG. 4 shows a block diagram of a computer system and the stereo light pattern and image collection unit of the present invention. Referring now to FIG. 4 the computer system 136 contains a processing element 402. The processing element 402 communicates to the other elements of the computer system 136 over a system bus 404. A keyboard 406 and a stereo light pattern and image collection unit 132 allow input to the computer system 136. A mouse 410 provides input for locating specific points on the image of the animal as displayed on graphics display 408, which also provides a display of any other information to be viewed by a user of the computer system 136. A printer 128 allows for output to paper to be viewed by a user of the computer system 136. A disk 412 stores the software and data used by the system of the present invention, as well as an operating system and other user data of the computer system 136.

A memory 416 contains an operating system 418, and an application program 420, a phenotypic measuring system for animals. Those skilled in the art will recognize that the operating system 418 could be one of many different operating systems, including many windows-type operating systems, and that many application programs could be performing in a multi-tasking operating system.

Flash unit 416 is used to capture an image of the markings on the animal, as described previously.

Figure 5:
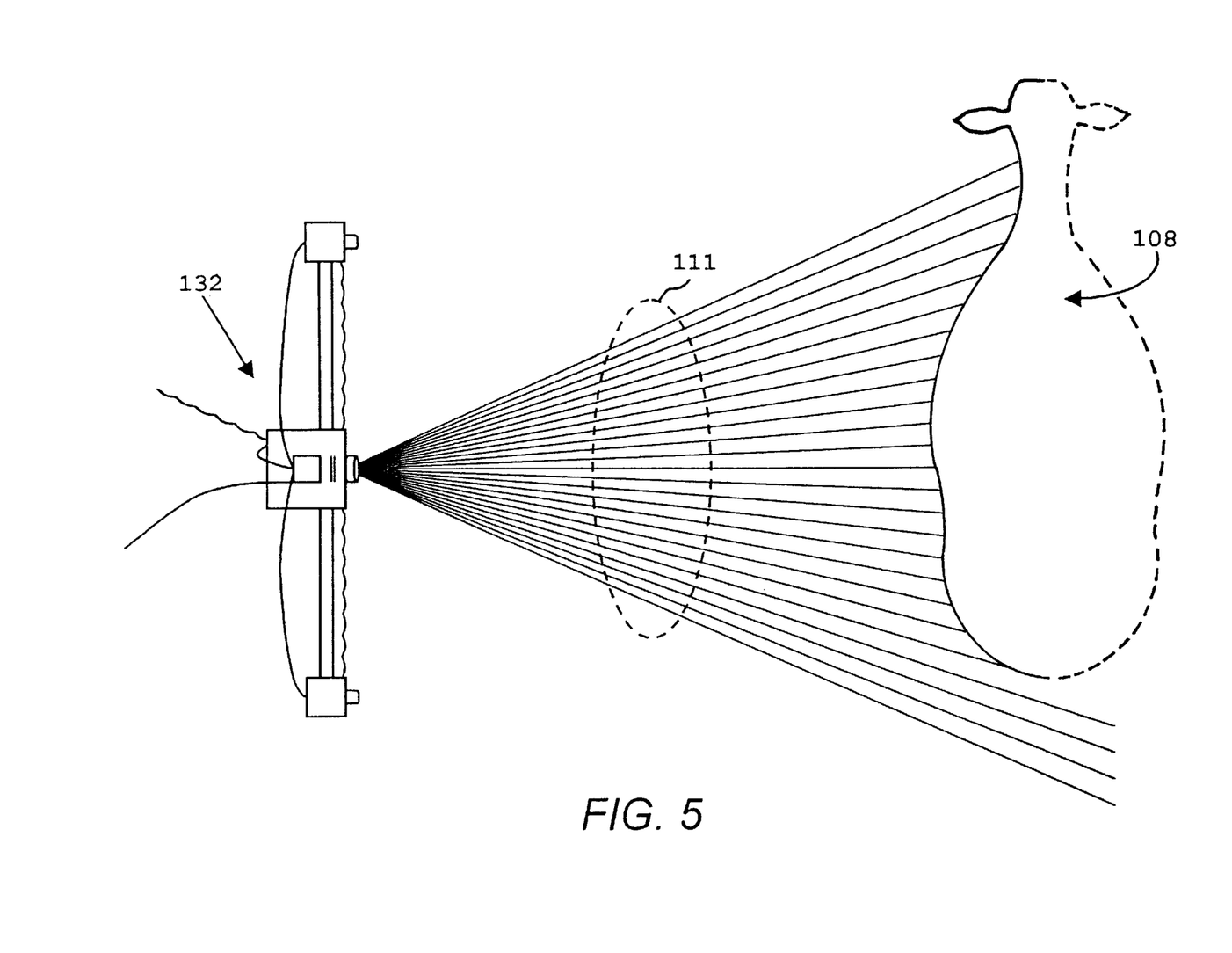
FIG. 5 shows a single linear horizontal cross section (overhead view) of an animal to illustrate a portion of the elements of a light pattern.

FIG. 5 shows a top view of a horizontal cross section of the animal and the patterned light elements, wherein the side of the animal opposite the stereo pattern light unit is shown in dashed lines. Referring now to FIG. 5, the stereo pattern light unit 132 scans a line of the animal 108 from the front of the body of the animal to the rear of the animal in FIG. 5. This example helps visualize the concepts of the patterned light signals 111 as they are projected to each point and create a portion of the three-dimensional surface model of the animal.

Figure 6:
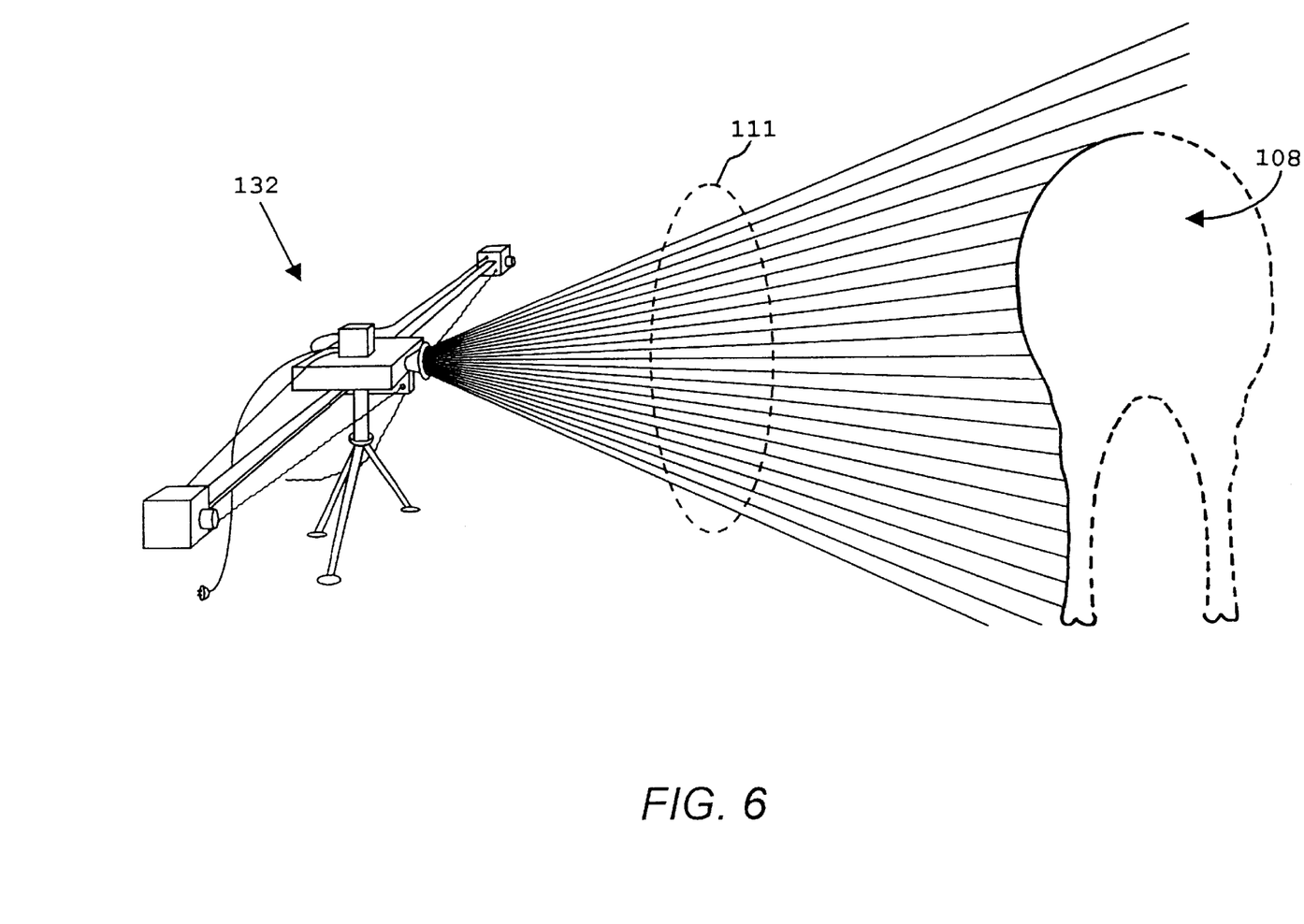
FIG. 6 shows a single linear vertical cross section (side view) of an animal to illustrate a portion of the elements of a light pattern.

FIG. 6 shows a side view of a vertical cross section view of the animal along with the projected pattern light elements to illustrate the three-dimensional surface model of the animal. Referring now to FIG. 6, the animal 108 is shown with the side away from the stereo pattern light unit 132 in dashed lines. The stereo light pattern and image collection unit 132 scans a line of the animal 108 from the top of the animal, i.e. 106 of FIG. 1, to the floor or ground. This example helps visualize the concept of the patterned light signals 111 as they are projected to each point and create a portion of the three-dimensional surface model of the animal.

FIG. 7 shows a plurality of circular light spot pattern elements being projected onto an animal. Referring now to FIG. 7, the animal 108 is shown with a plurality of circular spot pattern light elements, for example 702, 704, and 706. The precise pattern of the elements on the animal are difficult to portray in this diagram because the actual pattern light image molds to conform to the body contours of the animal. Additionally, the display image as well as each spot increases in size as it moves from the projection system to and through the depth of field of the light imaging devices. The wall 310 behind the animal 108 shows the patterned light display image represented in part by elements 708, 710, and 712 as the farthest segment in the depth of field which would also coincide with the farthest predetermined focal range in the depth of field.

The effects of spot size can be eliminated by measuring a center of each spot, and using this center as the location of the spot.

FIGS. 8A through 8D shows a series of consecutive scenes of circular light spot pattern elements being projected onto an animal. Referring now to FIGS. 8A–8D, the animal 108 is shown with a plurality of circular spot pattern elements as described in FIG. 7 in part as 702, 704, and 706. The animal in motion passes through a narrow lane and the stereo light pattern and image collection unit processes consecutive image scenes at predetermined intervals. Each of the scenes designated as numbers 8A through 8D are shown separately as they are viewed on a computer screen. For example, to measure numerous animals in an equitable manner, the computer system using only the right half of the image scenes then selects the scene for each animal that includes a continuous vertical row of pixels from the back (top) of the animal down the rear leg of the animal to the floor. In FIGS. 8A–8D, the example image scene in FIG. 8C would be selected and accepted by the computer system to complete the 3-dimensional image and all other image scenes would be rejected.

Figure 9:
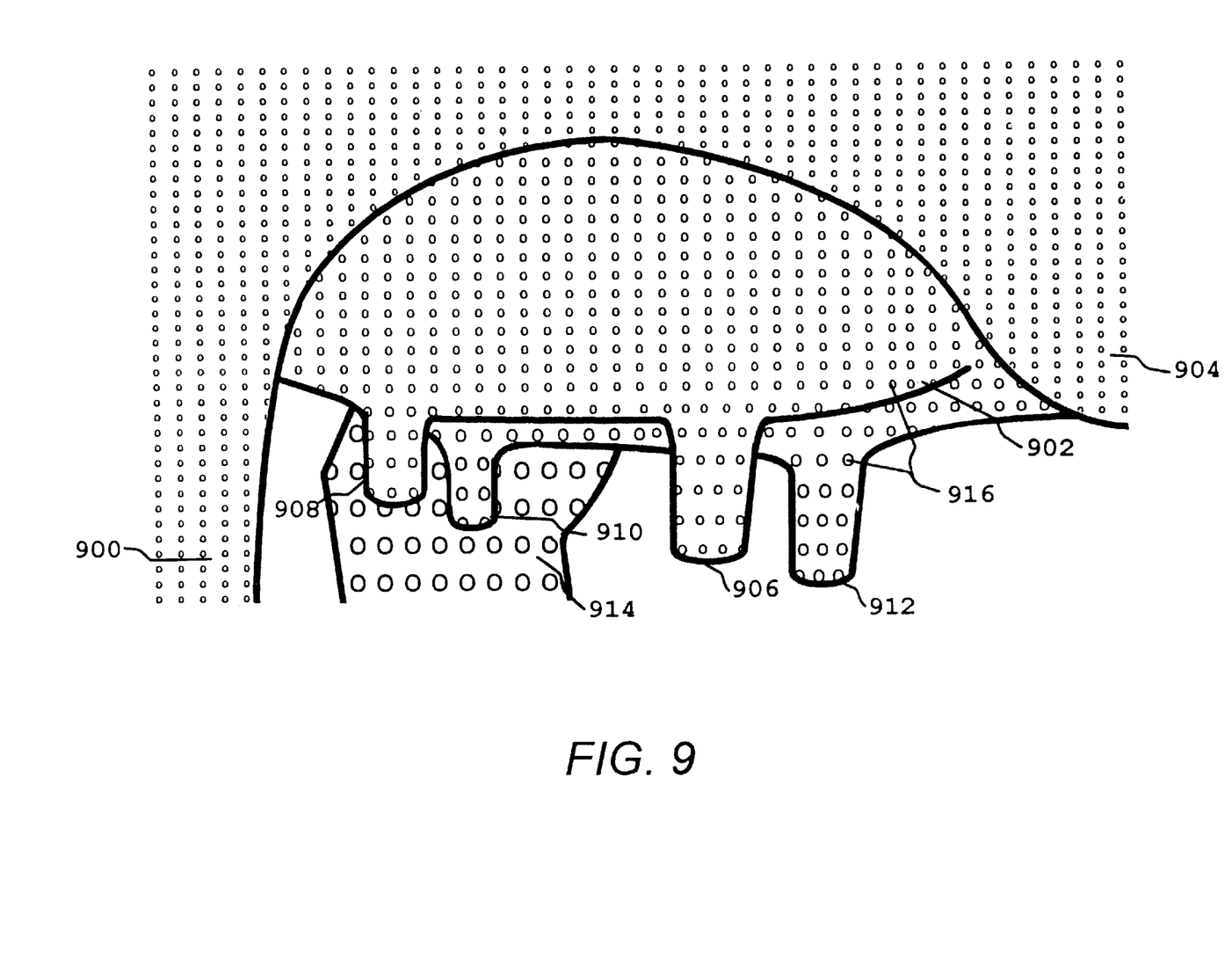
FIG. 9 shows a plurality of circular light spot pattern elements being projected on the rear body, legs and mammary of a dairy cow from a stereo light pattern and image collection unit designed to allow additional pixels at shorter ranges.

FIG. 9 shows a plurality of circular light spot pattern elements being projected on the rear body, legs and mammary of a dairy cow from a stereo light pattern and image collection unit designed to allow additional pixels at shorter ranges. Referring now to FIG. 9, the stereo light pattern and image collection unit is in a position below, to the side, and in front of the mammary (udder) of the dairy cow. The udder 902 of the dairy cow is viewed between the near hind leg 900 and the barrel (under belly) 904 of the dairy cow. The circular spot pattern light elements, for example 916 are displayed throughout the entire pattern light display image. Because the pattern light elements increase in size as they pass through the depth of field, the right front teat 906 has pattern light elements that are slightly larger than those pattern light elements on the rear leg 900, barrel 904 or side of the udder. The position of each teat 906, 908, 910 and 912 are slightly further from the stereo light pattern and image collection unit so that the pattern light elements, are progressively larger with respect to the distance that each teat is from the unit. The precise pattern of the elements on the animal mold to conform to the contours of the body, legs, mammary and teats.

In the example of FIG. 9, the z-axes of the circular spot pattern light elements are used to determine the teat locations and to differentiate between each teat location. The actual location of the teats is determined by the computer system by evaluating the z-axis distances that are greater than the distance of the closer hind leg 900 and less than the distances of the far rear leg 914. Once the teat area is located by z-axis distances then all other body parts are eliminated.

With only the teat area locations remaining, the system then tracks vertically down the remaining rows of elements with z-axis distances only in the range of the teat area. In the example of FIG. 9, teats are then located by the system when similar z-axis distances are found in less than four consecutive horizontal rows of pixels that continue vertically for less than three rows. The teats are then compared for z-axis distances to determine that the right front teat 906 as the closest distance and the right rear teat 908 as the second closest. Next, the left front teat 912 is determined at a greater z-axis distance and the left rear teat 910 is determined as the farthest teat. The teat ends are then defined as the lowest pixels found at each teat location. Locating the teats and the end of each teat will allow the teat cups of an automated milking machine to be attached and connected to each teat.

While the general inventive concepts and systems have been described in connection with illustrative and presently preferred embodiments thereof, it is intended that other embodiments of these general concepts and systems be included within the scope of the claims of this application and any patent issued therefrom. It is contemplated that use of the present system will enable an enhanced knowledge with respect to the correlation between measurable characteristics and traits of carcasses or animals and their offspring. While the general concepts and systems of the invention have been illustrated and described by reference to a particular kind of animal, i.e., beef animal, it is to be understood and it is contemplated that the general concepts may be applied to other kinds of animals or carcasses, such as pigs, dairy cattle, horses, chickens, dogs, etc. and human beings for any worthwhile purpose.

What is claimed is:

1. A system for measuring characteristics of an animal, the system comprising:
    an image projection system for projecting a plurality of light elements toward the animal to reflect therefrom;
    at least two imaging devices for receiving the reflected light elements and providing a reflected light image thereof from each imaging device; and
    a computer system for receiving each of the reflected light images and for determining horizontal, vertical and depth distance data for each light element contained within the reflected light images, and for measuring the characteristics of the animal using the distance data.

2. The system of claim 1 wherein the computer system further captures an image of identifying markings of the animal.

3. The system of claim 1 wherein the computer system determines, from the distance data, a volume of at least one portion of the animal.

4. The system of claim 1 wherein the computer system further determines a rating of the animal.

5. The system of claim 1 wherein the computer system further determines a radius of curvature of at least one area of the animal.

6. The system of claim 1 wherein the light elements comprise circular spots of light.

7. The system of claim 1 wherein the light elements comprise linear bands of light.

8. The system of claim 1 wherein the structure light elements comprise vertical linear bands of light projected at a first time and horizontal linear bands of light projected at a second time.

9. The system of claim 1 wherein the computer system receives at least two sets of images of the animal, and further wherein the computer system determines at least one movement characteristic of the animal from the at least two sets of images.

10. The system of claim 1 wherein the computer system receives at least two sets of images of the animal, and further wherein the computer system selects one of the sets of images wherein a predetermined characteristic of the animal is present.

11. The system of claim 1 wherein the computer system determines a location of at least one feature of the animal.

12. A method for measuring characteristics of an animal, the method comprising the steps of:
    (a) projecting a plurality of light pattern elements toward the animal to reflect therefrom;
    (b) receiving light pattern elements reflected from the animal with at least two imaging devices;
    (c) measuring vertical, horizontal and depth dimension data for each of the reflected light pattern elements received in step (b) to create a three-dimensional image;
    (d) measuring the characteristics of the animal from results of the measuring in step (c).

13. The method of claim 12 further comprising:
    (e) capturing an image of the animal wherein the image shows identifying marks of the animal.

14. The method of claim 12 wherein step (d) further comprises the step of computing, from the data of step (c), a volume of at least one portion of the animal.

15. The method of claim 12 further comprising the step of determining a rating of the animal.

16. The method of claim 12 further comprising the step of determining a radius of curvature of at least one area of the animal.

17. The method of claim 12 wherein step (a) further comprises projecting circular spots of light as the light pattern elements.

18. The method of claim 12 wherein step (a) further comprises projecting linear bands of light as the light pattern elements.

19. The method of claim 12 wherein step (a) further comprises projecting horizontal linear bands of light as the light patterns and step (d) further comprises the following step (d0) performed before step (d):
    (d0) repeating steps (a) through (c) while projecting vertical linear bands of light as the light pattern elements in step (a) and wherein the characteristics are measured from the results of the horizontal linear bands and the vertical linear bands.

20. The method of claim 12 further comprising the steps of:
    (e) repeating steps (a) through (c) to create a second three-dimensional image of the animal; and
    (f) measuring at least one movement characteristic of the animal from the measurements of the two images.

21. The method of claim 12 further comprising the steps of:
    (e) repeating steps (a) through (c) to create a second three-dimensional image of the animal; and
    (f) selecting one of the three-dimensional images measured in steps (c) and (e) wherein a predetermined characteristic of the animal is present in the selected three-dimensional image.

22. The method of claim 12 further comprising the steps of:
    (d) determining a location of at least one feature of the animal.

23. A system for measuring characteristics of an animal, the system comprising:

image projection means for projecting a plurality of structured light elements toward the animal to reflect therefrom;

image receiving means for receiving the reflected structured light elements and providing vertical and horizontal dimension data for each of the reflected structured light elements; and computer means for receiving the vertical and horizontal dimension data, for determining distance data comprising a distance between each of said structured light elements and a distance between the image receiving means and each of said structured light elements, and for measuring a location of at least one feature of the animal using said distance data.

* * * * *